United States Patent
McMahon

(10) Patent No.: US 9,304,500 B2
(45) Date of Patent: Apr. 5, 2016

(54) SYSTEM FOR BUILDING MANAGEMENT OF ELECTRICITY VIA NETWORK CONTROL OF POINT-OF-USE DEVICES

(71) Applicant: Cortland Research LLC, Homer, NY (US)

(72) Inventor: Stephen McMahon, Homer, NY (US)

(73) Assignee: Cortland Research LLC, Homer, NY (US)

( * ) Notice: Subject to any disclaimer, the term of this patent is extended or adjusted under 35 U.S.C. 154(b) by 447 days.

(21) Appl. No.: 13/729,890

(22) Filed: Dec. 28, 2012

(65) Prior Publication Data

US 2013/0184880 A1    Jul. 18, 2013

Related U.S. Application Data

(60) Provisional application No. 61/583,800, filed on Jan. 6, 2012.

(51) Int. Cl.
*G05B 13/02* (2006.01)
*H01R 13/453* (2006.01)
*G05B 15/02* (2006.01)

(52) U.S. Cl.
CPC ............. *G05B 13/02* (2013.01); *G05B 15/02* (2013.01); *H01R 13/4534* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 4,774,384 A | * | 9/1988 | Gregory | H01R 13/447 174/67 |
| 5,993,378 A | * | 11/1999 | Lemelson | A61B 1/00096 600/109 |
| 2002/0097546 A1 | * | 7/2002 | Weinberger | H01R 13/713 361/103 |
| 2005/0043907 A1 | * | 2/2005 | Eckel et al. | 702/62 |
| 2005/0068242 A1 | * | 3/2005 | Lee | H01Q 9/34 343/784 |
| 2007/0005306 A1 | | 1/2007 | Foessel | |
| 2007/0114053 A1 | * | 5/2007 | Castaldo et al. | 174/53 |
| 2009/0195349 A1 | | 8/2009 | Frader-Thompson et al. | |
| 2009/0243517 A1 | | 10/2009 | Verfuerth et al. | |
| 2010/0145542 A1 | | 6/2010 | Chapel et al. | |
| 2010/0270982 A1 | | 10/2010 | Hausman, Jr. et al. | |
| 2010/0289643 A1 | | 11/2010 | Trundle et al. | |

(Continued)

OTHER PUBLICATIONS

International Searching Authority/US International Search Report and Written Opinion for Corresponding International Application No. PCT/US2013/020269 mailed Mar. 11, 2013 (10 pgs).

*Primary Examiner* — Kenneth M Lo
*Assistant Examiner* — Geoffrey Wellman
(74) *Attorney, Agent, or Firm* — Harris Beach PLLC

(57) ABSTRACT

A system for monitoring and controlling electricity usage in a building includes a system control unit and an enhanced wiring device in wireless communication with the system control unit. The enhanced wiring device is hard-wired into the building electrical infrastructure, and is selected from the group consisting of an electrical outlet receptacle and an electrical power switch. The enhanced wiring device further includes a sensor for monitoring a stimulus parameter in a room of the building, a processor, at least one memory coupled to the processor, and program instructions stored on the at least one memory for execution by the processor to evaluate and communicate data from the sensor. The enhanced wiring device further includes an antenna for transmitting the sensor data to the system control unit, and a user interface connected to the system control unit adapted to configure and monitor data from the enhanced wiring device.

23 Claims, 11 Drawing Sheets

(56) References Cited

U.S. PATENT DOCUMENTS

2011/0043365 A1* 2/2011 Li .................. A01K 29/005 340/573.1

2011/0109424 A1* 5/2011 Huizenga .............. G05B 15/02 340/3.1

* cited by examiner

DEVICE STATUS:

| HOME (NO DEVICE) ▽ |
| STATUS |
| CHANGE SETUP |

| NAME | STATUS | ACTION | TEMPERATURE | POWER | CPM |
|---|---|---|---|---|---|
| THE FAN | OFF | NO | 71 DEGREES | 0 W | $0.00 |
| LAPTOP | ON | NO | 71 DEGREES | 116 W | $12.53 |
| SPACE HEATER | ON | YES | 73 DEGREES | 514 W | $55.51 |
| TOP LIGHT | ON | NO | 71 DEGREES | 81 W | $8.75 |
| SPIDER LIGHT | ON | NO | 71 DEGREES | 174 W | $18.79 |
| COFFEE MAKER | ON | NO | 73 DEGREES | 5 W | $0.54 |
| POWER POINT | ON | NO | 71 DEGREES | 2 W | $0.22 |
| PANEL LIGHTS | ON | NO | 73 DEGREES | 335 W | $36.18 |
| TURN ALL: | ON | OFF | TOTAL: | 1227 W | $132.52 |

REFRESH ALL-REFRESH PAGE (NO MSG)

FIG. 7A

SYSTEM FOR BUILDING MANAGEMENT OF ELECTRICITY VIA NETWORK CONTROL OF POINT-OF-USE DEVICES

CROSS REFERENCE TO RELATED APPLICATION

Reference is made to and this application claims priority from and the benefit of U.S. Provisional Application Ser. No. 61/583,800, filed Jan. 6, 2012, entitled "SYSTEM FOR BUILDING MANAGEMENT OF ELECTRICITY VIA NETWORK CONTROL OF POINT-OF-USE DEVICES" which application is incorporated herein in its entirety by reference.

FIELD OF THE INVENTION

The present invention relates to systems for control of electricity usage; more particularly, to such systems that include point-of-use devices; and most particularly, to a system incorporating a plurality of "smart" point-of-use electrical receptacles and switches, a system control unit, and a graphical user interface.

BACKGROUND OF THE INVENTION

Energy conservation is one of the most important investments that existing business owners can employ in their physical infrastructure to increase profits while helping the environment. The "low-hanging fruit" in building efficiency investments has been harvested, such as the installation of energy efficient windows, heating systems, and building insulation.

The commercial building market comprises commercial and governmental offices, campuses, restaurants, and healthcare facilities. Significant progress has been made, especially at the commercial level, in reducing energy consumption. Many large buildings are undergoing 'skin' retrofits—energy saving windows and insulation along with retrofits to the HVAC (Heating, Ventilating and Air Conditioning) systems to increase energy efficiency. Solar panels and wind farms are gaining adoption to supplement energy efficiency.

Commercial electric rates are higher than residential, thus providing a faster payback on the investment. Homes consume about 22% of the nation's energy, versus 49% for commercial and industrial buildings, according to the Department of Energy (DOE). And not surprisingly, commercial and industrial buildings waste a disproportionate amount of that energy.

In the US, the average power generating station was built in the 1960s and new plants, due to cost and the permitting process, are not coming on-line rapidly enough to deal with the increased demand for energy. The demand to reduce energy consumption is now attracting ESCOs (Energy Service Companies) to evaluate end point energy usage and provide solutions that are financed by the ESCOs thru project financing and performance contracting. While these efforts have resulted in substantial energy savings, none focuses upon the final usage endpoint, the electrical outlet or switch. Computers, printers, copiers, and other devices continue to consume energy even when not in use. Overnight, weekends and holidays—even in standby, energy is consumed and wasted.

Owners are demanding more information about the performance of their buildings so they can reduce operating costs and meet corporate sustainability goals. They are anxious to take full advantage of recent technology advancements that permit cost effective reduction in energy usage. Despite the best efforts of building owners, facility, and company managers to instruct employees to shut down equipment when not in use, few, if any do. Much like soaring healthcare costs due in part to consumers not shopping for the least expensive care, individuals have little incentive to reduce energy usage since the attendant savings do not accrue to the individual. Consider that many commercial buildings are open and operational only 30% of the total hours per week, although their computers and office equipment are left on 100% of the time.

SUMMARY OF THE INVENTION

Energy conservation development efforts are increasingly turning to comprehensive management systems for monitoring and controlling various aspects of electricity consumption in structures such as office buildings, stores, and residences. Many current systems are dependent upon tying into a region "smart grid" that presently does not exist and may never exist.

What is needed in the art is a stand-alone system of improved, new-generation smart electrical devices that can significantly impact the monitoring and control of electrical consumption at the final point of use, the electrical outlet, wherein an end user is not dependent on buying specific appliances, is not dependent for its success upon connection to an electrical grid, and is not reliant on outside energy suppliers for decisions on control. Briefly described, a Point Of Use Network Controlled Electrical (POUNCE) System in accordance with the present invention comprises a plurality of intelligent receptacles and switches (referred to herein collectively as "smart outlets" or "enhanced wired devices") that are wirelessly linked to a central system controller and user interface. The interface may be accessed in a variety of ways, e.g., manually, by smart phone, or via the internet. The smart outlets are drop-in replacements for pre-existing or prior art common outlets and switches built into the electrical infrastructure of a building. The smart outlets monitor and control the use of electrical appliances and report the information through proprietary methods, which information may be used and displayed in a variety of ways to aid a user in understanding and optimizing the electrical consumption in the building.

The information provided to the user is collected using real time, non-invasive methods thus providing the most accurate and up to date information possible. The smart outlets have the capability to integrate communications, antennas, data converters, electromagnetic components, and other discrete functions into compact designs.

The key benefits of the system are reduced consumption of the resources being monitored, a user's realization of payback on the investment, ease of installation, maintenance, and utilization. Less power consumed means lower operating expense in the form of utility bills, lower carbon emissions, and higher profits.

In one aspect of the invention, then, a system is disclosed for monitoring and controlling electricity usage in a building. The system includes a system control unit and an enhanced wiring device in wireless communication with the system control unit. The system control unit includes a processor, at least one memory coupled to the processor, and a network interface coupled to the processor. The enhanced wiring device is hard-wired into the building electrical infrastructure, and is selected from the group consisting of an electrical outlet receptacle and an electrical power switch. The enhanced wiring device further includes a sensor for monitoring a stimulus parameter in a room of the building, a processor, at least one memory coupled to the processor, and program instructions stored on the at least one memory for execution by the processor to evaluate and communicate data from the sensor. The enhanced wiring device further includes an antenna for transmitting the sensor data to the system control unit, and a user interface in communication with the network interface of the system control unit. The user interface is adapted to configure and monitor data from the enhanced wiring device via the system control unit.

In another aspect of the invention, in a system comprising one or more enhanced wiring devices in wireless communication with a system control unit, the enhanced wiring devices being one of an electrical outlet receptacle and an electrical power switch and comprising an antenna, one or more processors, at least one memory coupled to the one or more processors, and program instructions stored on the at least one memory for execution by the one or more processors, a method for conserving energy consumption of a building system is disclosed. The method includes the steps of hard-wiring the one or more enhanced wiring devices to a building's electrical infrastructure and sensing, by a sensor on one of the enhanced wiring devices, a stimulus parameter in a room of the building. The method further includes the steps of storing, in the memory, data representative of the sensed parameter, and executing program instructions to transmit the sensed parameter data to the system control unit.

In another aspect of the invention, a tamper-resistant electrical outlet is disclosed. The outlet includes a yoke assembly adapted for connection to an electrical lead wire of a building wiring system, and an interlock housing coupled to the yoke assembly. The interlock housing defines a recess. The electrical outlet further includes an interlock body comprising at least two wedge surfaces on a first side of the body adapted to provide a moveable barrier to prongs of a plug. The electrical outlet further includes a latching tab on an opposing second side of the body. The latching tab is positioned proximate to the recess in the interlock housing. The application of an uneven force to the wedge surfaces urges the latching tab into the recess in the interlock housing, and the application of a balanced force applied to the wedge surfaces urges the interlock body to move in a direction normal to the direction of the force.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
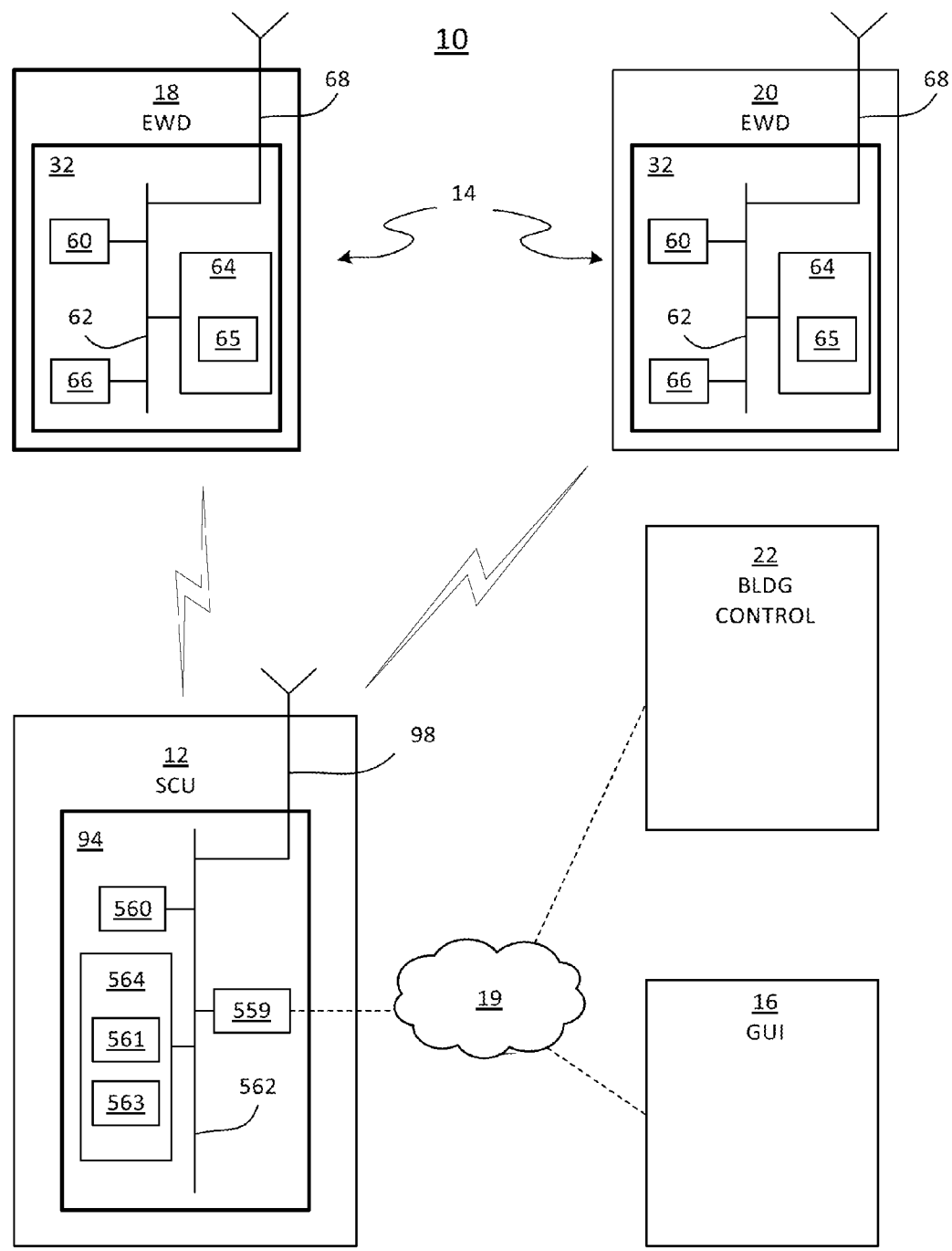
FIG. 1 depicts a block diagram of a system for monitoring and controlling electricity usage in a building, according to one embodiment of the present invention.

Referring to FIG. 1, block diagram for a point-of-use, network-controlled system 10 for monitoring and controlling electricity usage in a building is shown. The system 10 includes a system control unit 12, one or more enhanced wiring devices 14 in wireless communication with the system control unit, and a user interface 16 in communication with the system control unit. The enhanced wiring devices 14 are hard-wired to a building's wiring system (not shown), and replace or supplant conventional receptacle boxes and switches. As illustrated, embodiments of the enhanced wiring device 14 may include a wall-mounted outlet 18 or a wall-mounted switch 20. Each enhanced wiring device 14 includes one or more sensors to monitor stimulus parameters in the room, such as temperature, presence of occupants, power consumption of appliances connected to the electrical load, and current draw of the load, for example.

The user interface 16 (or user platform) may be embodied as a computer such as a laptop, desktop, tablet, smart phone, or any device that has browser capability. If embodied as a computer, the user interface 16 may communicate with the system control unit 12 in accordance with a wired network communications protocol, such as Ethernet, or may communicate in accordance with a wireless protocol, such as WiFi. The user interface 16 can provide a graphical interface (e.g., GUI) to configure and monitor each enhanced wiring device 14 in the network 10, and display important events occurring on the devices within the network. In one possible embodiment, a graphical user interface 16 could be positioned on the front face of the system control unit 12.

The system control unit 12 integrates and controls all the enhanced wiring devices 14 that are installed within the network 10, and communicates with the user interface 16 to provide real-time feedback, historical data, power consumption, cost forecasts, and alarm alerts for each device 14, for example. Customized configuration settings can be entered at the user interface 16 for each wiring device 14, sent to the system control unit 12, and wirelessly transmitted to each enhanced wiring device. In some embodiments, the system control unit 12 may communicate with a controller 22 for a building automation system network that facilitates the monitoring and control of mechanical, lighting, security and/or other systems of a building. In one aspect, data obtained from one or more enhanced wiring devices 14 can be used as input for a building's heating, ventilation, and air conditioning (HVAC) controller, or a building's lighting system controller, for example.

Figure 2:
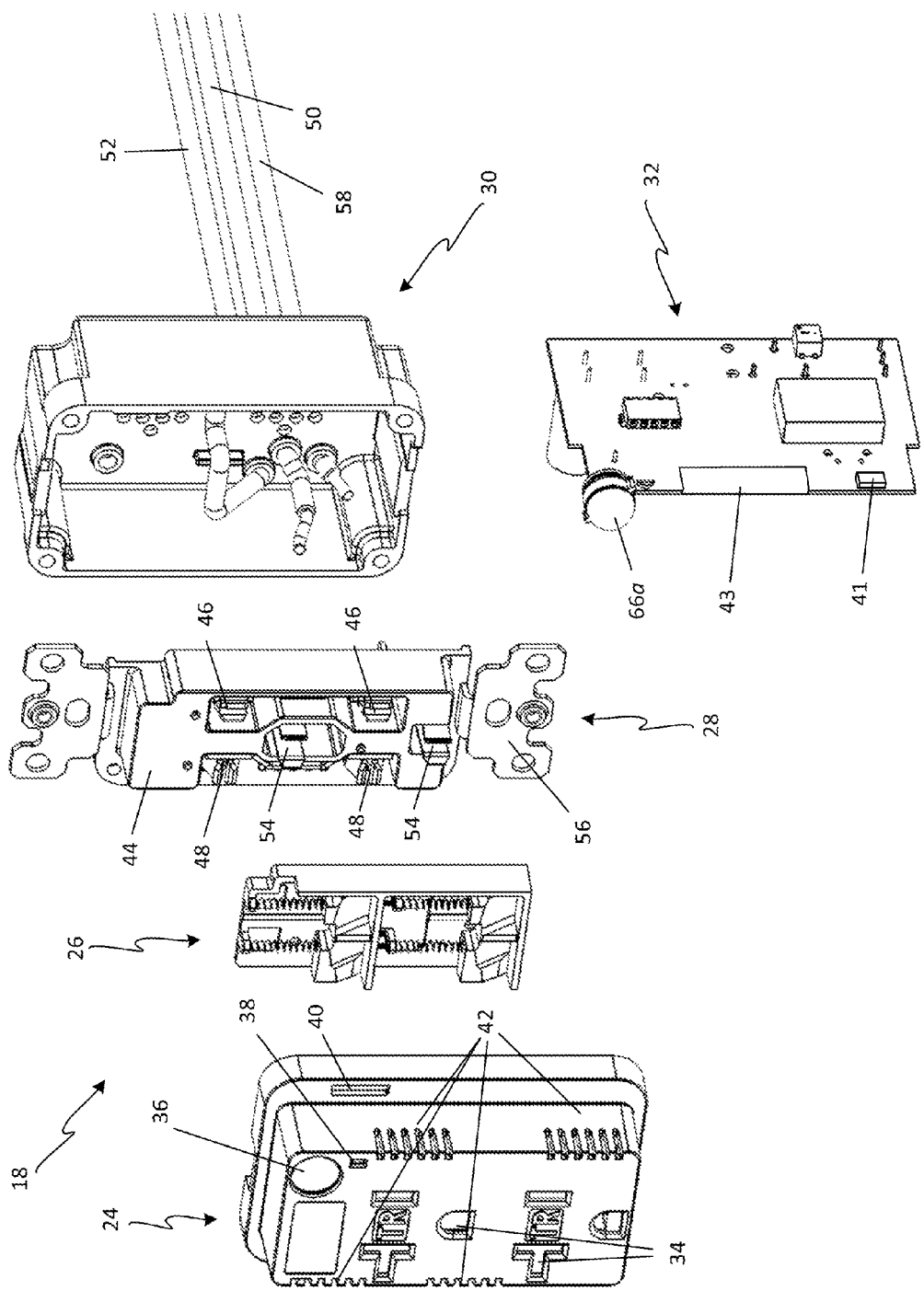
FIG. 2 depicts an exploded perspective view of an enhanced receptacle shown in FIG. 1.

FIG. 2 depicts an exploded perspective view the wall-mounted outlet 18. The outlet 18 may include a front bezel 24, a tamper resistant device 26, a receptacle assembly 28, and a conventional rear cover 30. The outlet 18 further includes an electronics package 32 which, in the illustrated embodiment, is embodied as a printed circuit board (PCB) assembly. The electronics package 32 contains the necessary hardware and software to carry out functions described in various embodiments of the disclosed invention.

The front bezel 24 mounts to the rear cover 30 to provide an environmental seal. The front bezel 24 defines openings 34 to accommodate the blades or prongs of a power plug (not shown), any may further define openings to accommodate sensors or indicators on the PCB assembly 32, such as opening 36 for a passive infrared sensor, opening 38 for an LED indicator, and opening 40 for a pin header. In one embodiment of the invention, when the outlet 18 is installed, the front bezel 24 protrudes out from the wall. In other words, the front bezel 24 is not flush with the wall. More accurate room temperature readings are obtained if a temperature sensor 41 installed on the electronics package 32 is located outside of the internal cavity formed by the rear cover 30. In this manner, the circuit board can be positioned transverse to the plane of the wall, so it extends forward along the inner vertical surface of the front bezel 24 and rear cover 30. The front bezel 24 and circuit board 32 can be configured to protrude out from the plane of the wall, and the temperature sensor 41 can be positioned at the front portion of the board such that it protrudes from the wall. In an effort to provide even more accurate readings of the room temperature, the front bezel 24 may further define circulation ports 42 adapted for passive air circulation through the internal cavity. The electronics package 32 may be secured within the internal cavity formed by the front bezel 24 and the rear cover 30, embodied as a printed circuit board with associated hardware and software.

In a related embodiment, the printed circuit board 32 may further include an antenna 43 to wirelessly receive and transmit communications from the system control unit 12 (FIG. 1). In the illustrated embodiment, the antenna 43 is a copper microstrip and is positioned on the front edge of the printed circuit board such that, like the temperature sensor 41, the antenna protrudes away from the plane of the wall and out into the room space. One advantage of this construction is that the performance of the antenna 43 is not compromised by a rear cover or electrical box 30 that is formed of metal. Thus, in a building's wiring system that includes external metal raceways, for example, the disclosed outlet 18 can be retrofit into the existing system without affecting the performance of the antenna 43.

Although not illustrated in the present embodiment, active circulation could also be used to provide an accurate reading of the room temperature. For example, a small fan with minimal parasitic power draw could be placed in the cavity.

The receptacle assembly 28 of the wall-mounted outlet 18 includes a main body 44 or contact holder, which is adapted to secure a hot blade contact element 46 and a neutral blade contact element 48. The back side of the hot blade contact element 46 has provisions to connect through the circuit board 32 to a hot lead 50 of the building's electrical infrastructure, and the back side of the neutral blade contact element 48 has provisions to connect through the circuit board 32 to a neutral wire 52. In this manner, various functions and controls can be utilized, such as electrical voltage and current monitoring circuitry for measuring instantaneous power, including real and reactive power. Ground prongs 54 connect to a yoke assembly 56, which is secured to the back side of the main body 44. The yoke assembly 56 has provisions to connect to a ground wire 58 of the of the building's electrical infrastructure. In one embodiment, an isolated ground option is designed to electrically isolate the mounting strap, which is normally electrically connected to the grounded wiring and plug insert terminals, by removal of a connecting screw, tab, or other mechanical means.

Figure 3:
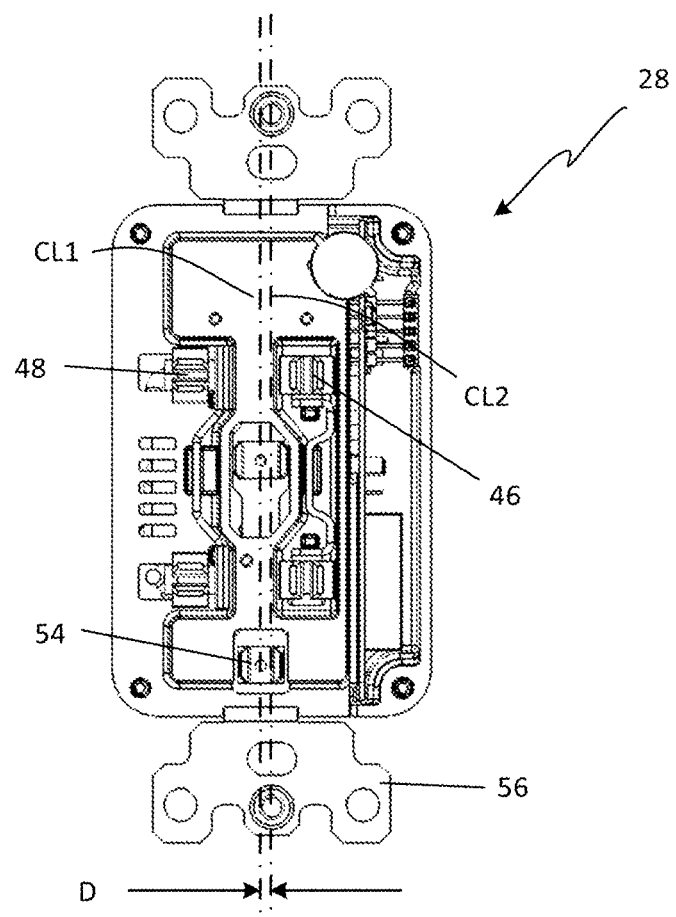
FIG. 3 depicts a front plan view of the enhanced receptacle shown in FIG. 2.

Referring now to FIG. 3, a front plan view of the receptacle assembly 28 is shown with the front bezel removed. One unique aspect of the receptacle assembly 28 is that the centerline CL1 of the hot blade contact element 46, the neutral blade contact element 48, and ground prong 54 are offset a distance D from the centerline CL2 of the yoke assembly 56. In one respect, the offset D could create additional internal volume for the circuit board assembly 32 so the temperature sensor 41 and antenna 43 mounted thereon could protrude out of the plane of the wall.

FIG. 1 depicts a block diagram of the electronics package 32 in each enhanced wiring device 14, according to one embodiment of the invention. The electronics package 32 includes a processor (or CPU) 60, such as microcontroller, coupled to a system bus 62. Computer readable memory 64 is coupled to the system bus 62. In one example, the memory 64 is integral non-volatile memory, such as erasable programmable read only memory (EPROM). Memory 64 may contain program instructions 65 to operate the enhanced wiring device 14 according to input received from the system control unit 12, or from sensor data on-board the electronics package.

The electronics package 32 further includes one or more sensors 66 to monitor stimulus parameters in the room. Exemplary sensors include, but are not limited to, the temperature sensor 41, and a passive infrared (PIR) sensor 66a (FIG. 2) to detect motion or the presence of occupants. In one embodiment, a user can set the sensitivity of the PIR sensor 66a remotely by programming different thresholds. Thus, an enhanced wiring device 14 (such as outlet 18) can detect when an individual is sitting at their cubicle, but the sensitivity of the PIR sensor 66a can be set to a higher threshold to trigger on close-in movement only. In this manner, the sensor 66a will not trigger if someone is walking down the aisle between cubicle rows. Other sensors in the electronics package 32 may include a current sensor and a voltage sensor. The enhanced wiring device 14 can be provided with program instructions 65 to calculate power to the load from the voltage and current measurements. Other sensors 66, not shown but contemplated for use with the system 10, include microphones for voice commands that could transmit commands back to the system control unit 12, and $CO_2$ sensors along with associated alarms. The electronics package 32 may include any combination of sensors and capabilities due to its modularity of design. The electronics package 32 may further include an on/off contactor relay (not shown) to connect and disconnect electrical loads plugged into the enhanced wiring device 14 (the contactor determines the number of poles and throws). The microcontroller 60 may further include analog to digital converters to digitize the analog output of the sensors.

The electronics package 32 further includes a transmitter and receiver, or transceiver 68, to communicate with the system control unit 12. In one example, the transceiver 68 is a WiFi radio coupled to antenna 43. As described above, the transceiver may also be mounted on circuit board 32 such that it protrudes from the wall, thereby allowing installation of the enhanced wiring device 14 into a common metal electrical box without decreasing the antenna's performance.

Figure 4:
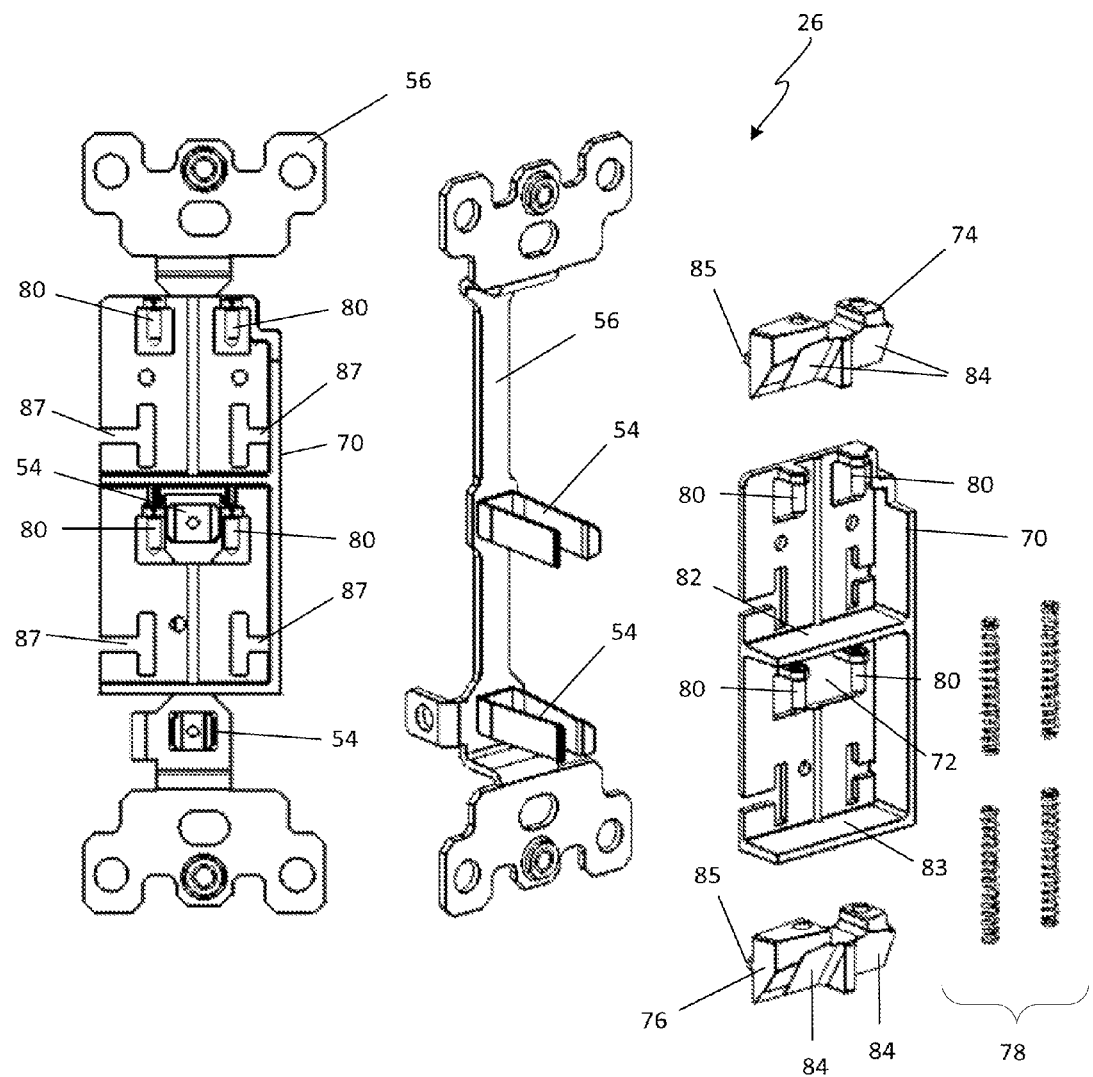
FIG. 4 depicts a front plan view and an exploded perspective view of the tamper resistant device shown in FIG. 2.

FIG. 4 depicts a front plan view and perspective exploded view of the tamper resistant device 26 in accordance with one embodiment of the invention. In the plan view, the interlock bodies and springs are removed for clarity. The tamper resistant device 26 includes an interlock housing 70 sized for engagement with the yoke assembly 56 such that the upper ground prong 54 protrudes through an opening 72 in the interlock housing and the lower ground prong 54 is positioned underneath the interlock housing. Upper interlock body 74 and lower interlock body 76 include precisely located holes sized to accept the lower end of springs 78. The top portion of each spring 78 is supported by guide pins 80 that mate with the recessed hole in the interlock body when the springs are compressed and the interlock is in the open position. The springs 78 are sized to provide enough force to keep the bodies 74, 76 in the closed position while relaxing to allow access under normal operation. When the outlet 18 is not in use, the springs 78 urge the upper and lower interlock bodies 74, 76 against corresponding upper and lower shelves 82, 83 and block the plug blade openings 34 in the front bezel 24 (FIG. 2).

The blocking surface of each interlock body 74, 76 includes a complex wedge surface 84 that incorporates fulcrums and slopes that allow the body to slide up when balanced force is applied to both sides. The sloped surface is angled such that insertion of the prongs of a plug will urge the interlock bodies upward and out of the way. In one embodiment of the invention, the interlock body may be formed of an electrically non-conductive material such as plastic. The wedge surface 84 may be at an angle from the horizontal in the range of 31 to 41 degrees, for example. In the illustrated embodiment, each interlock body 74, 76 also includes latching tabs 85 (partially hidden) on the back side for denying access when uneven force is applied. The latching tabs 85 are aligned in proximity to a corresponding recess 87 in the interlock housing 74. When a force (towards the wall) is applied to the wedge surface 84, the fulcrum causes the latching tab 85 to slightly pivot away from the wall, thereby assuring the tab does not engage the recess 87. However, if uneven pressure is applied to the wedge surfaces 84, such as when a knife or coin is pushed into only one of the blade openings 34, the uneven pressure forces the opposing latching tab 85 to pivot into the recess 87 and the interlock body will not lift vertically out of the way.

Figure 5:
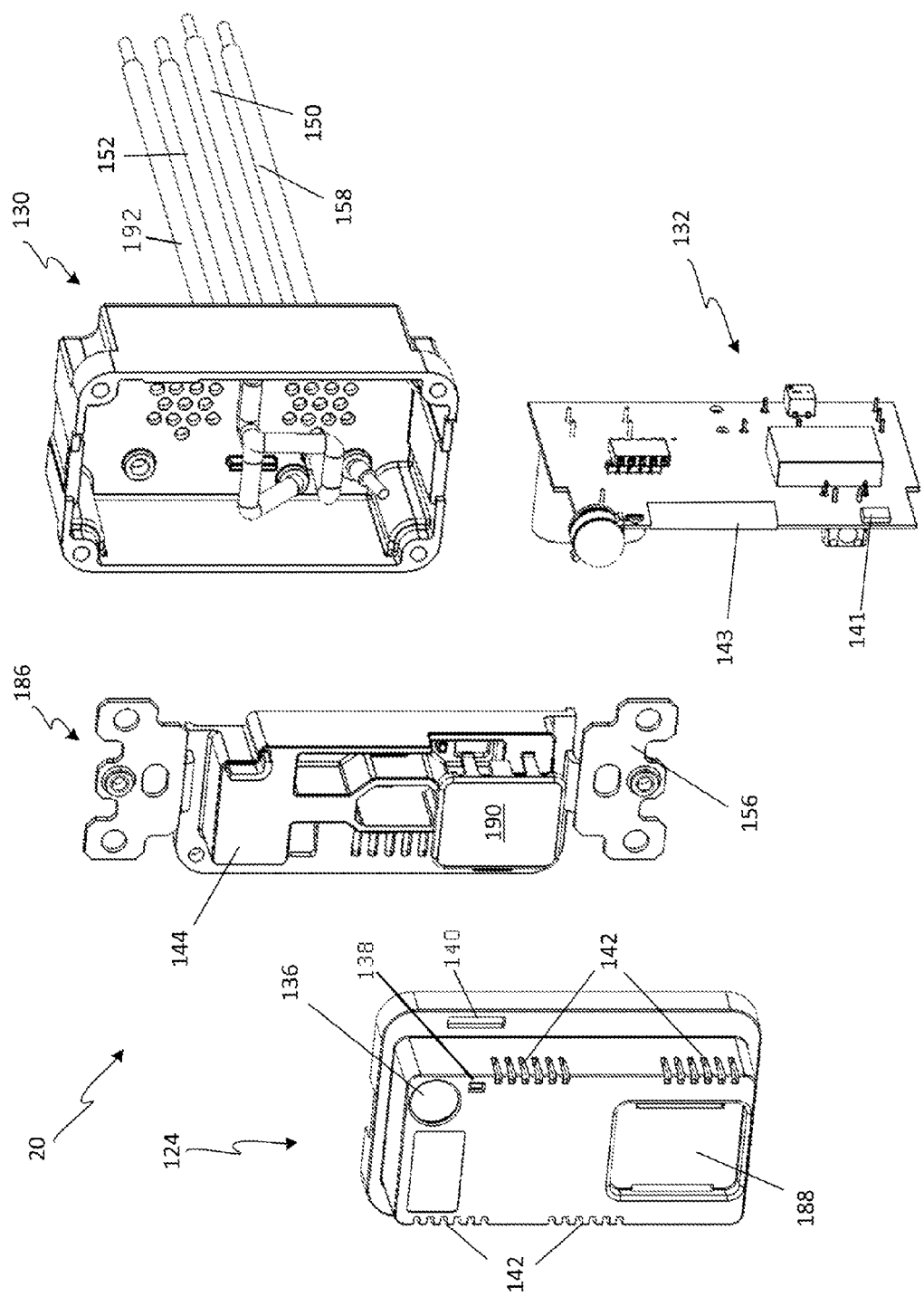
FIG. 5 depicts an exploded perspective view of the enhanced switch shown in FIG. 1.

FIG. 5 depicts an exploded perspective view the wall-mounted switch 20, according to one embodiment of the invention. The switch 20 can be manufactured substantially similar to the outlet 18. That is, the switch 20 may include a front bezel 124, a switch assembly 186, a conventional rear cover 130, and an electronics package 132 which, like the package described with respect to FIGS. 2 and 4, may be embodied as a printed circuit board assembly. In one example, the front bezel 124 may define an opening 188 for a push-button switch. The front cover 124 may further define openings to accommodate sensors or indicators on the PCB assembly 132, such as opening 136 for a passive infrared sensor, opening 138 for an LED indicator, and opening 140 for a pin header. The front bezel 124 may also protrude from the wall when installed to allow positioning the circuit board 132 transverse to the plane of the wall, so it extends forward along the inner vertical surface of the front bezel 124 and rear cover 130. Circulation ports 142 may be adapted to for passive air circulation through the internal cavity of the front and rear housings 124 and 130, respectively.

The switch assembly 172 includes a main body 144 or contact holder, which is adapted to secure a switch button assembly 190. The main body 144 is secured to a mounting flange 156, which have provisions to connect to a ground wire 158 of the of the building's electrical infrastructure. The hot, neutral, and switch leads 150, 152, 192, respectively, secure to the circuit board 132 for control functions initiated by the system control unit. The general layout and operation of the circuit board 132 is as described with reference to FIGS. 2 and 4. For example, various functions and controls can be utilized, such as electrical voltage and current monitoring circuitry for measuring instantaneous power, including real and reactive power for loads wired through the switch, such as lighting or motor loads. Circuitry may further include an on/off contactor relay to connect and disconnect loads wired through the device, and a momentary or maintained lever, toggle or push-button switch. The switch may be programmable to always respond to the opposite contactor state regardless of initial position. Also, the switch may be programmed to ignore the change of switch state. This would apply to applications that desire only radio communicated or internally programmed switching commands. The switch response may also command actions of other devices physically apart from the circuit connected to the switch by sending the switch command to other devices in the system or integrated with the system. For example, a bathroom switch that is connected to the lights may close the contactor upon detection by the PIR detector. If the same switch is manually engaged, the device may radio that action elsewhere to turn on the exhaust fan.

In the illustrated embodiments, a NEMA 5-20 receptacle (20 amp, 120 VAC) is shown. However, the inventive concepts disclosed herein may be used with any standard or custom receptacle in any country of the world, at any voltage rating. For example, 240 volt receptacles in hotel rooms providing power to individual heat pumps, electric heating units, or air conditioning units can be advantageously used in various embodiments of the present invention.

Likewise, in the illustrated embodiments a single-pole, single throw switch is shown. However, switch 20 may include single pole, double pole, single throw, and double throw switches, 120 VAC or 277 VAC single phase, and 15 or 20 amp rated, commonly used in building wiring.

Figure 6:
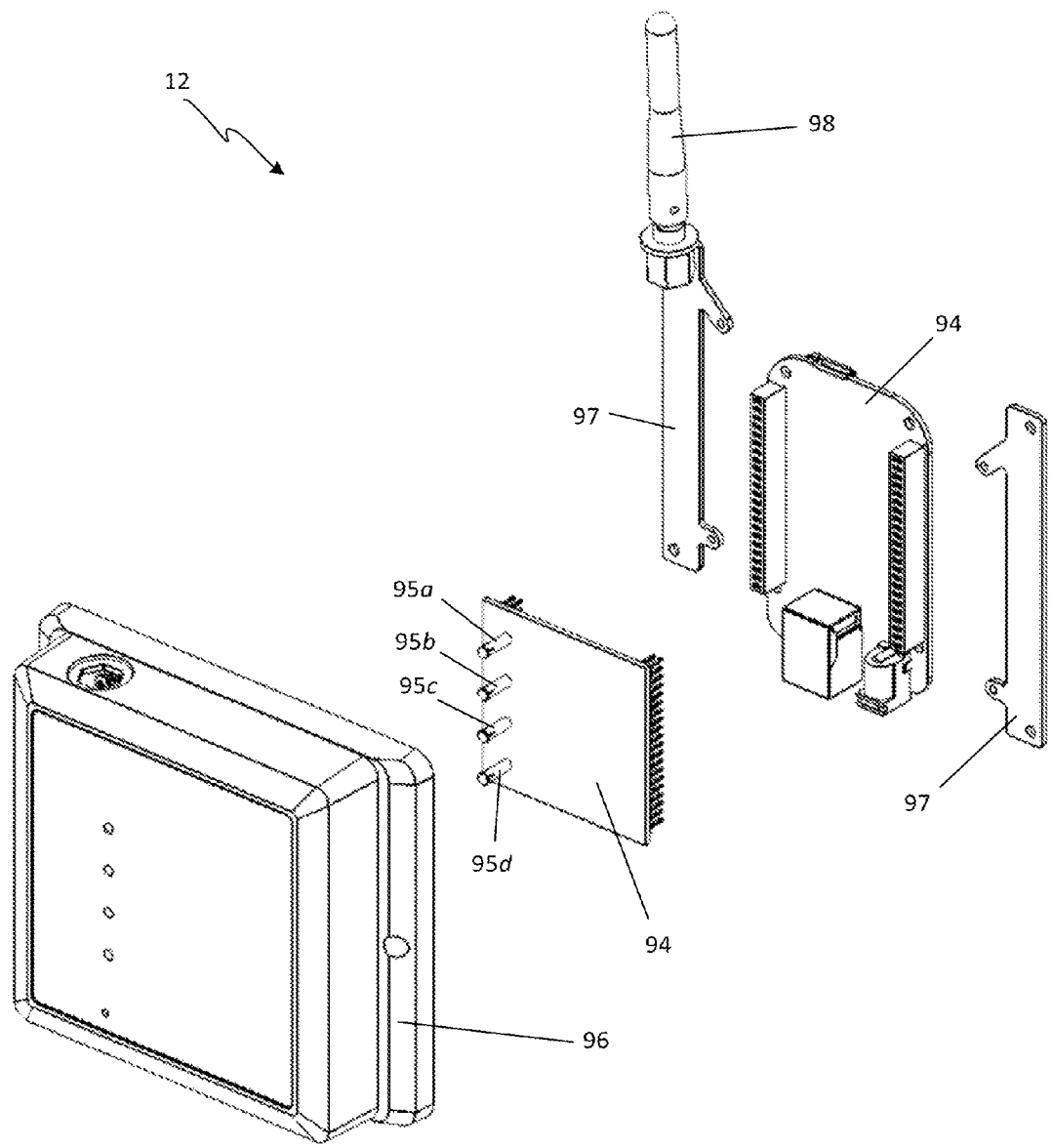
FIG. 6 depicts an exploded perspective view of the system control unit shown in FIG. 1.

FIG. 6 depicts an exploded perspective view of the system control unit 12, which in one embodiment is a compact computer system 94. The compact computer system 94 can include all the functionality of a basic computer, such as a computer board with a microprocessor and a micro SD card (e.g., non-volatile memory). The computer system 94 may further include a battery that allows for graceful shutdown or glitch ride-through so as not to damage the memory card. The computer system 94 may further include a real time clock with battery back-up so the enhanced wiring devices 14 (FIG. 1) can sequence with the system and return to their configured operation soon after a power outage. If the system control unit 12 is connected to the Internet, the system clock can be updated from an NTP server. Otherwise, the system 94 runs on its own clock set during initial configuration. Thus, each enhanced wiring device 14 has the capability to synchronize and maintain a real time clock consisting of ss/hh/dd/mm/yyyy time, for example.

The computer system 94 may also include an expansion board 94a with a microcontroller for radio communication interface between the radio card and the microprocessor. In the illustrated embodiment, the system control unit 12 has four multi-colored indicator LEDs on the expansion board 94a: a blue LED 95a Status indicator; a yellow LED 95b Alert indicator; a green LED 95c Device Network indicator; and a red LED 95d DC Power indicator. The system control unit 12 may further include a protective wall enclosure 96 and mounting support plates 97. In one embodiment, the system control unit 12 communicates with the enhanced wiring devices 14 over a wireless personal area network (WPAN) such as the MiWi protocol. The system control unit 12 may include a 2.4 GHz radio and monopole antenna 98 as part of the MiWi physical structure.

FIG. 1 depicts a block diagram of the computer system 94 within the system control unit 12. The computer system 94 includes a processor 560 that is coupled to a system bus 562. Processor 560 may utilize one or more processors, each of which has one or more processor cores. A system memory 564 is also coupled to the system bus 562. System memory 564 is defined as a lowest level of volatile memory in computer 94. This volatile memory may include additional higher levels of volatile memory (not shown), including, but not limited to, cache memory, registers and buffers. Data that populates system memory 564 includes the computer's operating system 561 and application programs 563. The operating system 561 also includes a kernel (not shown), which includes lower levels of functionality for the operating system, including providing essential services required by other parts of the operating system and application programs 563, including memory management, process, and task management.

As depicted, the computer system 94 is able to communicate with the building automation system controller 22 and the user interface 16 via network 19 using a network interface 559. Network 19 may be an external network such as the Internet, or an internal network such as an Ethernet or a virtual private network. Accordingly, application programs 563 may also include a browser, which includes program modules and instructions enabling a world wide web client (i.e., computer 94) to send and receive network messages to the Internet using hypertext transfer protocol (HTTP) messaging, thus enabling communication with other computer systems, such as such as laptops, personal computers, smart phones, tablets, and the building automation system controller 22.

In operation, the system 10 can be organized so that each enhanced wiring device 14 has its own instruction set. The action taken by each device 14 is based on its individual programmed configuration. In one embodiment, the response to exceeding a threshold can be one of three options: change the contactor state, report to the system control unit 12, or both. The system control unit 12 may have its own instructions to command other enhanced wiring devices 14 to respond as well, or to send a text message or email.

Each of the enhanced wiring devices 14 may be programmed from the graphical user interface 16. The user interface 16 includes the capability of a user to configure and initialize the system 10. In one example, the user interface 16 may provide tables for device entry, such as device type (e.g., outlet 18 or switch 20), device location, device ID for radio communication, and device group. Other device entries could include a motion detection option (enabled or disabled), and a contactor feature option (enabled or disabled). The unique address, associated location, and unique identifying name for each enhanced wiring device 14 and unique configuration commands for each device may be retained in the memory 64 of the device (FIG. 1). For example, a user can program the enhanced wiring device 14 to respond to thresholds for each of the sensors 66. As stated above, an exemplary response can be to open or close its own contactor, send a notice to the system control unit 12, or both. Then the system control unit 12 may command a different enhanced wiring device 14 to respond as well. Other actions can be taken when a sensor threshold is reached. For example, every change in power of six watts may be recorded and time stamped. Or, every other threshold may be time-stamped and stored. In another example, every enhanced wiring device 14 uploads its history to the system control unit 12, including the temperature, every hour or two.

The user interface 16 may also be programmed to provide real-time display of all the enhanced wiring devices 14 in the system 10. Currently, energy consumers are not provided information that indicates the cost of the power usage at the sub-circuit level. They have no reason, therefore, to attempt to reduce the time that certain appliances are operational. The disclosed system 10 provides statistics and real measurements that can be converted to actual cost for operating connected equipment. Consumers can use this information to make decisions on when to operate the monitored appliances.

In another embodiment of the invention, the system 10 provides four thermostat modes of operation for an enhanced wiring device 14, defined as "Thermostat Mode 1", "Thermostat Mode 2", "Thermostat Mode 3", and "Thermostat Mode 4". These modes are used by the system 10 to control a climate control apparatus, heating or cooling device, or thermostat. The apparatus, device or thermostat can be directly connected to the contactor of an enhanced wiring device 14, or the enhanced wiring device 14 may provide temperature data to the system control unit 12 so it can control another enhanced wiring devices 14, or communicate with a third party device.

Thermostat Mode 1 is used when a heating or cooling device with an existing thermostat is being controlled. If an individual is present in the room, occupancy (e.g.,motion) will keep the device on, regardless of temperature. If an individual is not present, the device will operate the contactor to keep the temperature within an "Efficiency Range," which is a lower temperature setting. Mode 1 is similar to a programmable setback thermostat, where the user programs through a user interface time-of-day settings and comfort levels for when they are present and an efficiency level when they are gone.

Thermostat Mode 2 is used when a heating or cooling device without an existing thermostat is being controlled, and a "Comfort Range" is used to perform that function instead. If an individual is present, the enhanced wiring device 14 will operate the contactor to keep the temperature within the Comfort Range. If an individual is not present, the device 14 will operate the contactor to keep the temperature within the Efficiency Range. The same comfort and efficiency levels are used, but they are based upon occupancy. If the occupancy sensor (e.g., PIR sensor) detects a presence it will command the climate control system to go to the Comfort Range; otherwise it reverts back to the Efficiency Range.

Thermostat Mode 3 is used when a heating or cooling device with an existing thermostat is being controlled, such as in hotel rooms with existing heat pumps, or heaters. The room-installed climate control system has its own thermostat dial that allows the occupant to set their own comfort level. If the enhanced switch 20 detects occupancy, power is allowed to go to the heat pump, without regard to the temperature of the room. When the person leaves the room, the heat pump is controlled to the Efficiency Range.

Thermostat Mode 4 is used when a device is providing remote temperature data to the system control unit 12 so that it can in turn provide the data to a third party device. This mode does not control the contactor or observe any temperature ranges, but it does provide temperature reporting capability.

One noted improvement of the disclosed system 10 is that sensor readings from one enhanced wiring device 14 can be used to control the operation of a power load through another device 14. Any of the enhanced wiring devices 14 can be programmed for any one of the three active modes, and command instructions from the device to the system control unit 12 can command another outlet or another switch to perform the function. For example, when a person walks into their hotel room, and they turn on the lights using an enhanced switch 20, a message can be sent to the system control unit 12 that somebody walked into the room. The system control unit 12 is intelligent enough to command other enhanced wiring devices 14 to turn on the heating to the Comfort Range, for example.

Figure 7:
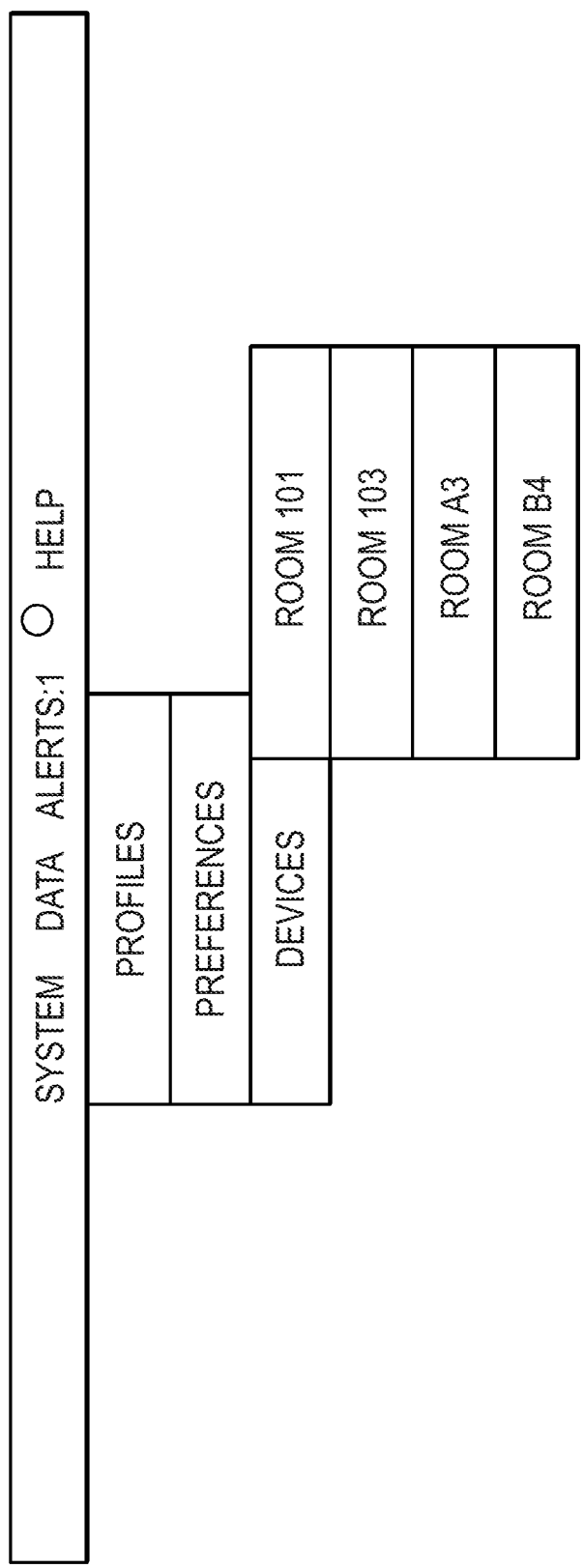
FIGS. 7A and 7B depict exemplary displays of a graphical user interface for the system control unit.

FIG. 7A illustrates an exemplary display of a graphical user interface 16 during operation, in which eight enhanced wiring devices 14 are being monitored. The data is displayed in real time and in a simple format. The Name column represents the load connected to an enhanced wiring device 14. The Status column indicates whether the device 14 is passing power to the connected load. The Motion column indicates if motion has been detected within an allotted time span. The Temperature column indicates the recorded ambient temperature at the device 14. The Power column shows the amount of power passing to the connected load. The column labeled CPM indicates the cost per month if the indicated load was left on continuously for one month.

FIG. 7B depicts another exemplary display of a graphical user interface 16 in which a top level Dashboard page allows a user to quickly navigate and select a group of enhanced wiring devices 14 in a room or location. In the illustrated example, the user can navigate to the enhanced wiring devices located in Room 103 by mousing over System>Devices>Room 103.

The graphical user interface 16 thus provides management of the enhanced wiring devices 14 to relay commands to designated devices upon reception of notification of preprogrammed stimulus from other enhanced wiring devices 14 in the system 10. The user interface 16 also provides capability to program automatic queries of each enhanced wiring device 14 in the system to obtain the recorded data stored within each device. Other actions include forwarding the stored data from each enhanced wiring device 14 to the system control unit 12 upon request by user interface 16, or at any time the system 10 and user interface 16 are connected; querying the status from any enhanced wiring device 14 as requested in real time commands received from the graphical user interface 16; and the ability to allow unsolicited messages from any enhanced wiring device 14 preprogrammed to report stimulus conditions.

In one embodiment of the invention, the system 10 does not require special software on the user's platform 16. The system 10 may be browser-based, thus the data and information stored on the memory 564 of the system control unit 12 can load onto the user's platform 16 like a web page. The user may keep initial browser settings stored in their own platform's memory to reduce the time to reload after the initial connection. The user may also prefer to save the data stored on the system control unit 12 to their platform as a backup or for later analysis.

The memory 564 of the system control unit 12 can include application programs or program instructions 563 for a variety of tasks, and the results can be viewed in real-time by a user on the user's platform 16. For example, the system control unit 12 can include graphing capability to allow a user to select variable(s) to plot on the y axis (ordinate) and the data type to plot on the abscissa, including limits, such as start and stop time.

The system control unit 12 can maintain autonomous control of the enhanced wiring devices 14 in the network 10 as configured upon installation and upon updates to the configuration as received from the user interface 16. User information settings may be entered to manually or automatically relay system information to the user or to other allowed parties through any external communication means including, but not limited to, Ethernet communications, Wi-Fi, POTS, and the like. Configuration settings may also be entered to track the energy costs as dictated by the electrical utility provider. The system 10 can have the capability for real time and instantaneous user interaction with the devices 14 to take actions such as retrieve the status and sensor data upon query, or command a device 14 to change its contactor state through manual manipulation at any electronic device connected to the user interface 16, including but not limited to a keyboard or mouse of any connected computer, a cell phone through text or voice messaging, and a smart phone through web based applications. The system 10 may also provide provisions for storage capability of retrieved data for historical logging, as well as interactive plotting of any and all possible means for viewing the data, including but not limited to individual device data, homogenous, heterogeneous, and conglomerate data from any variety or combination of devices and for any variable length of time, including the statistical representation and analysis of energy cost. The system 10 may further provide communication and coordination with "Smart Grid" compatible interfaces and the "Smart Grid" system, communication and coordination based on interfaces with other building systems, including but not limited security systems, occupancy systems, other energy systems, and other control systems, and the capability of forming a system of multiple system controlled at a single interface.

The disclosed system 10 can thus be utilized to effect behavioral changes on a macro-level resulting from the information provided. In one example, Company "A" has a policy to create a worker-friendly environment by allowing their employees to choose their own working hours. Most of the employees arrive between 8:00 a.m. and 9:00 a.m., and leave between 4:30 p.m. and 5:30 p.m. A few employees come in before 6:00 a.m. and one or two leave as late as 7:00 p.m. The statistics recorded by the disclosed system 10 can give the facilities manager an actual representation of the population in the building over any span of time, including day, week, month and year, based upon the accumulation of the occupancy sensor's time-stamped data for each threshold crossing. Further, the recorded averaged temperature data from the same devices can be compared with the occupancy data over time. Conclusions can be made from this recorded historical data, such as the cost of heating or cooling a building to accommodate a very small number of workers versus the ability to reduce the hours of comfort level heating and cooling by restricting the hours of business operation.

Figure 8:
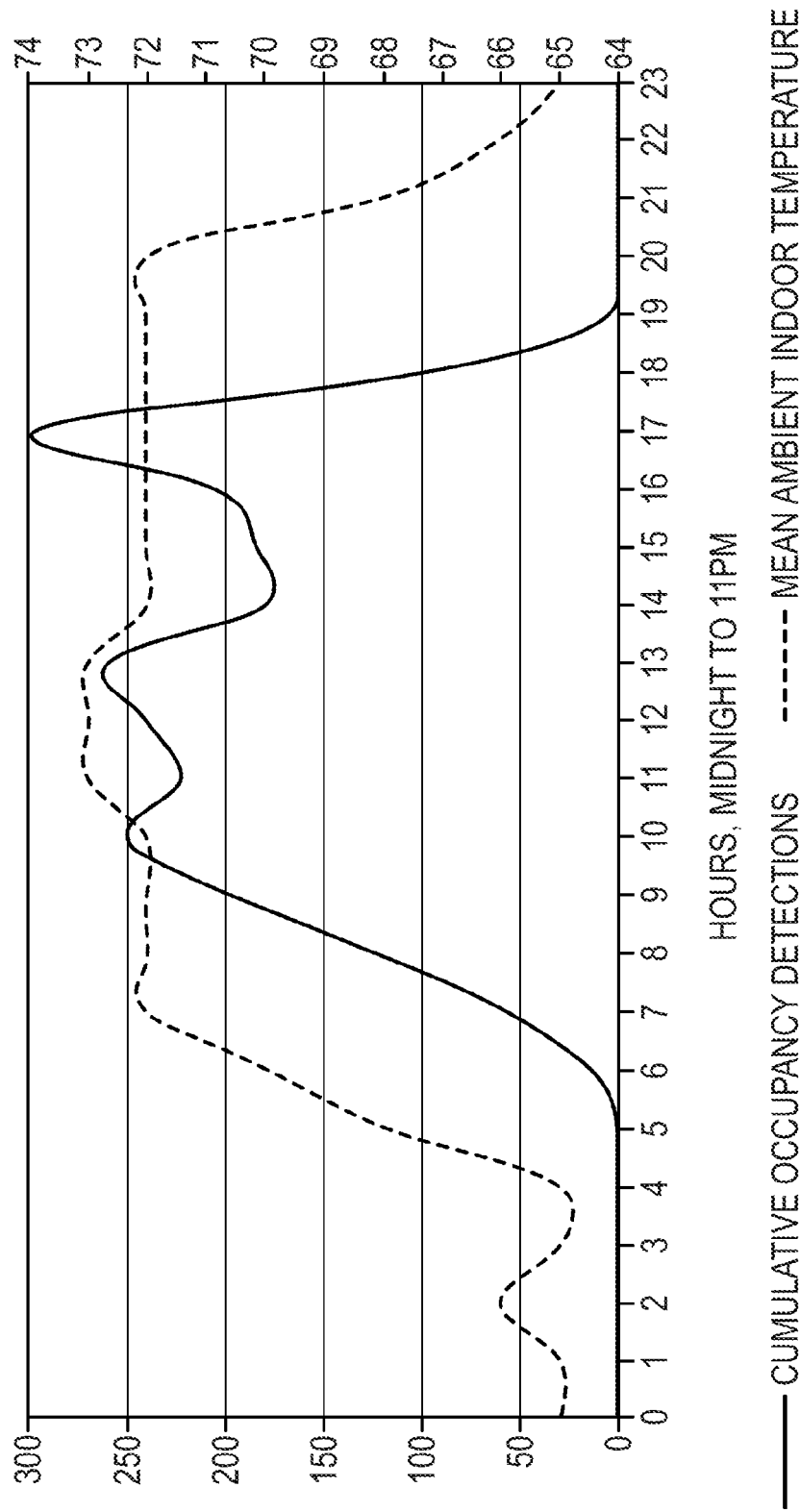
FIGS. 8 and 9 depict Time-Temperature-Occupancy graphs for data collected from the system shown in FIG. 1.

The Time-Temperature-Occupancy graph depicted in FIG. 8 illustrates an example of how this type of data can be displayed. Temperature is scaled in degrees Fahrenheit and is denoted on the right axis. Occupancy detections are shown on the left axis. The data is recorded during the heating season, so the temperature is reduced during off hours. Examination of this data shows that the building temperature setting remains at the higher comfort level until after 8:00 p.m. It also shows that the number of people in the building approaches zero around 7:00 p.m.

Figure 9:
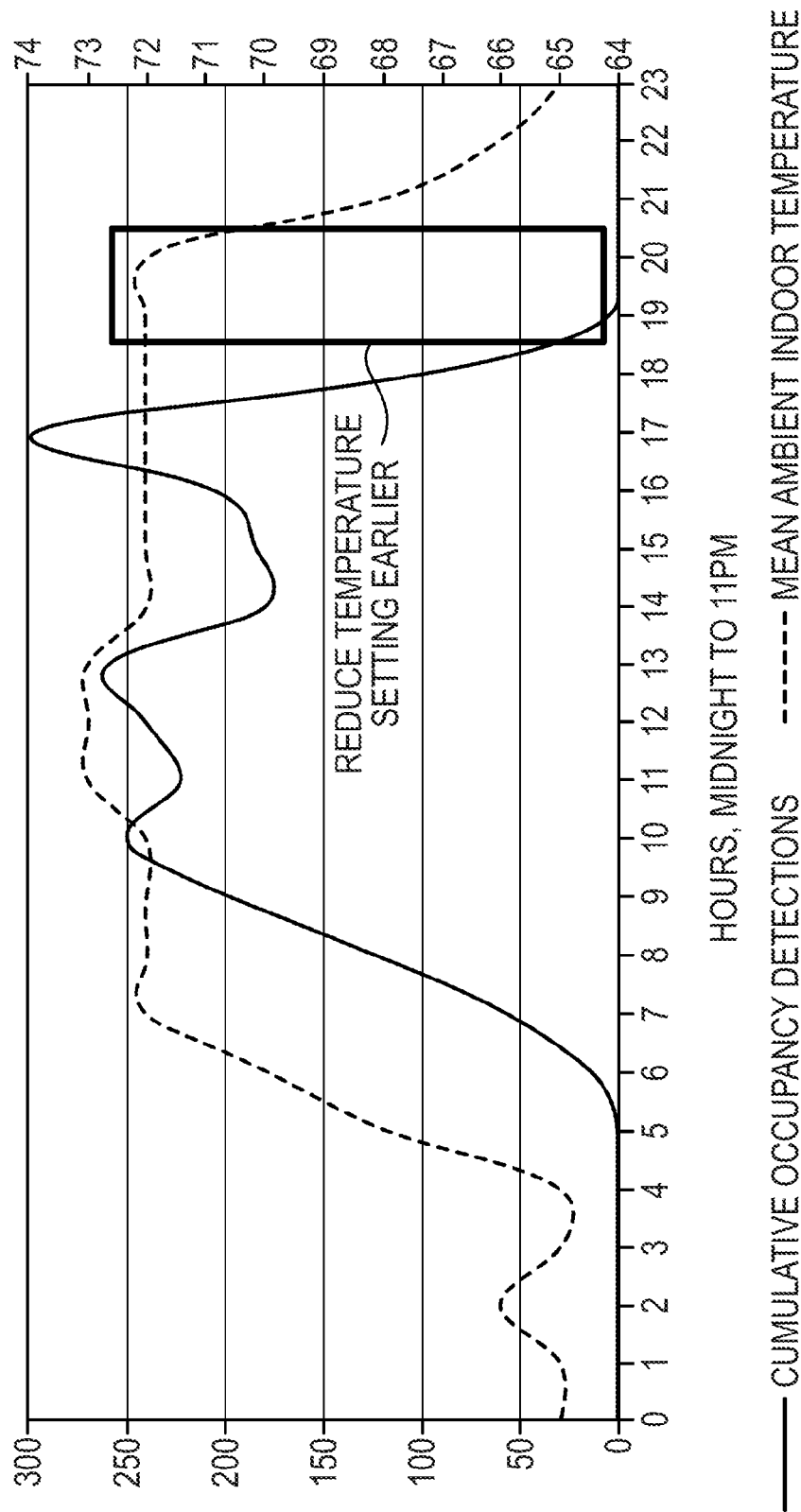

The Time-Temperature-Occupancy graph depicted in FIG. 9 displays the same data and also shows by the area within the box when the heating system may be adjusted with minimal alteration to the daily operations. The facilities manager could easily reduce the temperature by nearly two hours per day and meet the comfort needs of the occupants. The reduction in heating costs can be directly observed either by power measured through the enhanced wiring devices 14 controlling unit heating/cooling appliances, or upon receipt of the monthly metered utility company bill. Upon further inspection, the business owner can make a decision of the value of continuing the company policy of flexible working hours.

The granularity of the data provided can be used to analyze single rooms within a building, such as hotel rooms or college dorm rooms, or to analyze a complete campus. If the heating and cooling system is zoned by the room, and the power to the unit is supplied through an enhanced wiring device 14 (such as switch 20) operating as the controlling thermostat, no interface to a larger system is necessary. For large zones or heating sources that utilize large electric loads such as geothermal or for systems that use fossil fuels, utilizing the data as shown in the example above, and the interface capabilities of the system, the system 10 could be programmed to interact intelligently with the building heating/cooling system to respond to occupancy in real time. Given that information and interface capability, the building heating/cooling system would respond directly to motion detections and change the room temperature without the external need of analysis, manual interaction or intervention.

Still referring to FIGS. 8 and 9, given the adequate intelligence of the heating/cooling plant, the temperature setting would have automatically been reduced in the 7:00 p.m. time frame, using the BACnet protocol, for example. The system 10 can also interact with sub-system components without directly interfacing to large heating and cooling plant such as furnaces large air conditioning units and boilers by directly controlling zone valves, dampers and other equipment to maintain comfort levels.

At the individual behavioral level, the normal interaction with daily energy consumption is to turn on loads, which most often is lighting, and only turn off the load when it is an annoyance. By requiring action to keep loads turned on, the length of time that energy is consumed when not necessarily needed can be reduced. For example, a business owner can program branch circuits feeding outlets and lights to go off in the building at a certain time of day. If this was the only option, employees would not be able to continue working after the hard shut-off. Productivity would decrease. With the disclosed system 10, assuming occupancy is not detected, the lights will turn off as scheduled. However, if occupancy is detected near the time that the lights are scheduled to turn off, the lights will stay on until a second programmed turn off time. This may require motion, albeit minimal, by the user to keep lights on. Since the enhanced wiring devices 14 contain motion sensors, the user only needs minimal motion to be detected, such as waving their hand in front of an enhanced outlet 18 or enhanced switch 20 at their desk.

Figure 10:
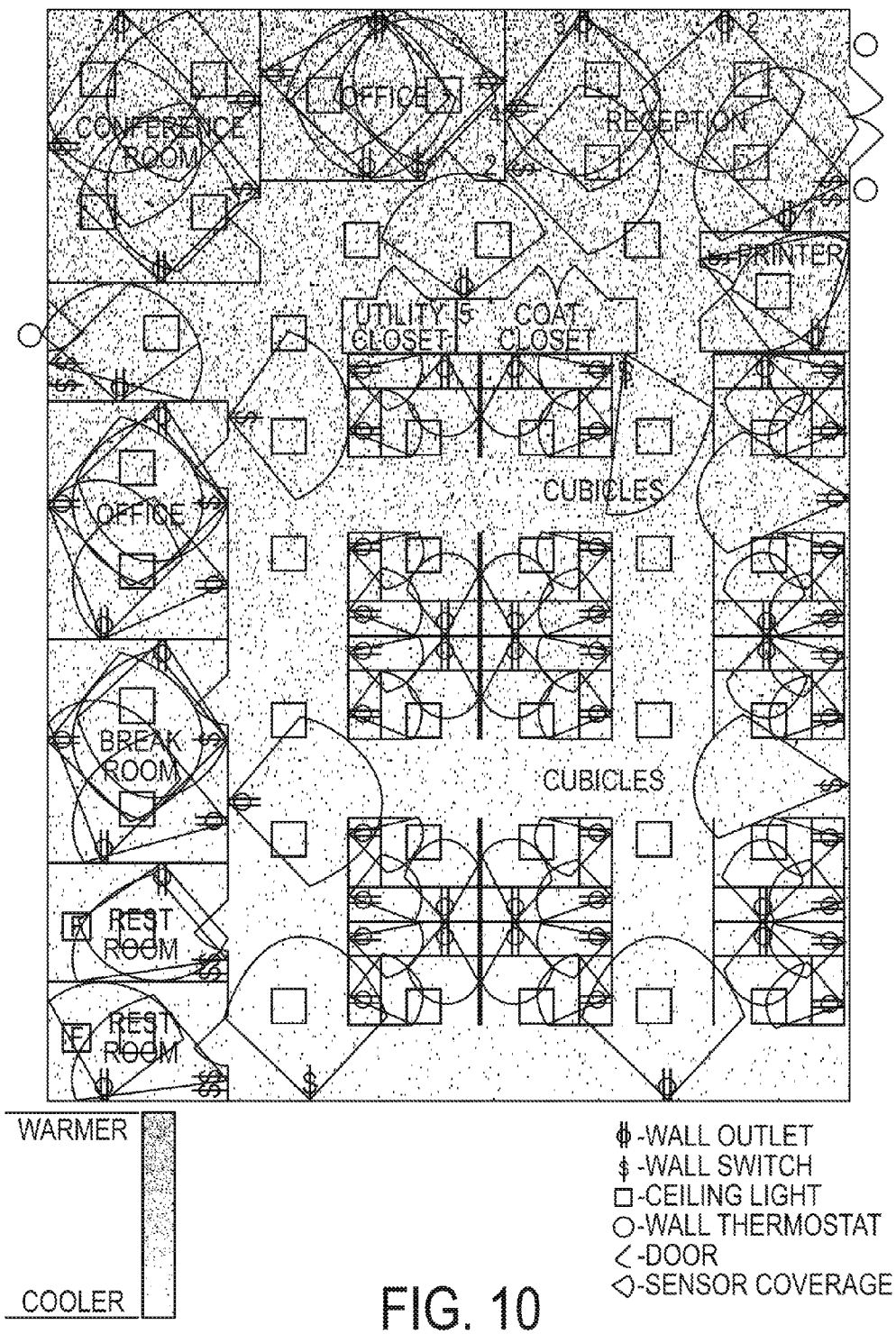
FIG. 10 depicts a 2-D thermograph for data collected from the system shown in FIG. 1.

In another example of the disclosed system 10 being utilized to effect behavioral changes on a macro-level, FIG. 10 graphically depicts a 2-D temperature overlay of an office environment, where the lines indicate regions of constant temperature. The thermal map was generated using temperature data obtained from enhanced wiring devices 14 located within the office. The plot shows that portion of the office with the Reception area and Conference Room is significantly warmer than the opposite side of the office where cubicles and rest rooms are located. This data can be used to intelligently rebalance the HVAC system, relocate thermostats, improve insulation where the temperature is not as expected, and possibly adding another zone.

In other embodiments of the invention, the system control unit 12 can be adapted for total building monitoring of energy use, energy quality, building occupancy, organic building use trends, building temperature, preventive maintenance, optimization of energy consumption of all connected loads, including but not limited to HVAC, lighting, electronic appliances (printers, PCs and laptops, televisions, audio and video equipment, cooking appliances, other loads that utilize power, as in a sleep mode, while powered off to the user).

The flexibility of the software design in the system 10 provides the ability to communicate to other building systems. The system 10 may therefore have the ability to integrate with any other type of building management control system and may facilitate the monitoring and control of mechanical, lighting, security and/or other systems of a building. In some cases, the control unit 12 may communicate with a building network controller 22 in accordance with a wired communication protocol such as, for example, the Building Automation and Control Network (BACnet) protocol, a master-slave/token-passing (MS/TP) protocol, LON, CBUS, ModBus, or any other suitable wired network protocol, as desired.

In one embodiment of the invention, the system 10 implements the BACnet protocol for communicating data between modern building control systems. The system 10 can provide useful and real-time information regarding building power usage at the device (sub-circuit) level, and building occupancy and ambient temperature at the sub-room level. This shared information can increase the efficiency of other systems by dynamically adjusting the heating and cooling loads and by adapting security system features.

The disclosed system 10 can add additional established protocols and proprietary protocols for interfacing with other systems that will enhance the user's experience while reducing energy consumption. For example, given information communicated from a badge-swipe or digital-keyed entry system, the system 10 can correlate the person's identification to their office location and energize the lighting, outlets and heating or cooling units in anticipation of the person's arrival.

A further example of integration with security systems includes the feature of power access prediction, wherein an occupant using a security badge or code of any type to enter an area can be associated with a specific location in the building, whereby the security system sends this information to the system 10 which then lights only the path to the individual's designated location and powers the receptacles at the individual's location to allow connected electronic devices to boot up as the user approaches.

Further refinement of the system 10 may provide an embodiment wherein the sensitivity of the PIR sensors is set remotely by programming different thresholds. In one example, an enhanced wiring device 14 can detect when someone is sitting in their cubicle. The sensitivity can be adjusted such that someone walking down the cubicle row will not trigger an alert. In other words, the threshold is set higher to trigger on close-in movement only.

In another embodiment of the present invention, the enhanced wiring devices 14 sense occupancy by means of measuring the quality of the transmitted or received signal to and from each wiring device and system control unit 12, in concert with the motion sensing electronics embedded within each wiring device. The signal-quality measurement may be accomplished by measuring the amplitude and/or the bit-error-rate of the intentionally attenuated signal or some other characteristic of the wireless communication signal.

Current state of the art in occupancy sensing includes PIR, ultra-sonic acoustic, and radar technology for sensing occupancy. Each of them has deficiencies wherein intermittent or continuous motion is a requirement by the occupant to prove occupancy over a given time span. The signal quality method does not require continuous or intermittent motion.

Individuals knowledgeable with the art of wireless communications recognize that there is commonly a change in the wireless communication link when a body is in close proximity to the transmitting or receiving device antenna. The signal launched by the antenna can be attenuated and occasionally amplified based on the effect of the change in impedance and direction of antenna gain when a body is nearby. Taking advantage of this characteristic, the present system utilizes an algorithm to improve the performance of the occupancy detection function.

The algorithm is not part of the normal communication link Receive Signal Strength Indicator (RSSI) adjustment made between linked devices. In this algorithm, while the area is unoccupied, a device intentionally attenuates its transmitted signal until the receiving device Bit Error Rate (BER) reaches a minimum but measurable decodable message rate. The receiving device knows the intended message and compares the known message to the received message. The transmitting device then uses that value of attenuation as the occupant-calibration value. At predetermined intervals, the two devices communicate at occupant-calibration level to test the BER. If a body is in close proximity, the signal will change by either attenuating the signal to a much higher BER or a much lower BER as compared to the calibrated BER. This is the indication of a nearby body, or in this case, an occupant. This same scenario may instead use a self-attenuated internal receive path at the device instead of relying on the transmitting device to reduce its output power, for the same BER test.

With this algorithm applied between many devices throughout a building, conveniently located within enhanced wiring devices 14, where the algorithm may be applied as a standalone function or it may be applied in conjunction with the traditionally PIR technology occupancy sensor or other sensor technologies within each wiring device or as separate devices, the quality of the occupancy sensing function is greatly improved.

Another embodiment of the disclosed system 10 is the utilization of very low power transmitters that are embedded into a user's identification badge (not shown)that transmit a special identification code at very low power and a low duty cycle. This low power signal is enough to be received by the wiring devices within close proximity to the user throughout the building. This application extends the useful life of a single ID card for many years before replacing the battery. This ID badge may also be utilized on any type of equipment for the purposes of tracking the location of these hard assets, whereby a building facilitator is required to locate the equipment for maintenance and/or calibration.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A system for monitoring and controlling electricity usage in a building, comprising:
   a system control unit comprising a system control unit processor, at least one system control unit memory coupled to the system control unit processor, and a network interface coupled to the system control unit processor;
   an enhanced wiring device in wireless communication with the system control unit, the enhanced wiring device being hard-wired into the building electrical infrastructure and selected from the group consisting of an electrical outlet receptacle and an electrical power switch, the enhanced wiring device comprising:
      a plurality of sensors including a passive infrared (PIR) sensor for monitoring a stimulus parameter in a room of the building, and a temperature sensor, said PIR sensor and said temperature sensor disposed at a front edge of a circuit board;
      an enhanced wiring device processor, at least one enhanced wiring device memory coupled to the enhanced wiring device processor, and program instructions stored on the at least one enhanced wiring device memory for execution by the enhanced wiring device processor to evaluate and communicate data from the sensor;
      an antenna to wirelessly receive and transmit communication with the system control unit, said antenna comprising a vertically oriented microstrip disposed at a front edge of said circuit board such that when said enhanced wiring device is mounted in a wall of a room, said circuit board is oriented about perpendicular to the wall and said antenna protrudes away from a plane of the wall towards the room such that a performance of said antenna is not compromised by a rear cover or an electrical box within which said enhanced wiring device is disposed;
      a front bezel having a front surface and a plurality of side surfaces which covers said antenna and said circuit board with access via openings in said front bezel front surface to either of said electrical outlet receptacle or said electrical power switch disposed under said front bezel extending into said front bezel beyond said plane of said wall, said front bezel including an opening in said front surface for said PIR sensor and a plurality of circulation ports disposed in at least two sides of said plurality of side surfaces; and
   a user interface in communication with the network interface of the system control unit, the user interface adapted to configure and monitor data from the enhanced wiring device via the system control unit.

2. The system in accordance with claim 1, wherein the user interface is a graphical user interface coupled to the system control unit via Ethernet.

3. The system in accordance with claim 1, wherein the program instructions on the enhanced wiring device command an on/off contactor relay to connect and disconnect electrical loads wired thereto.

4. The system in accordance with claim 1, wherein the system control unit issues configuration settings to the enhanced wiring device so that the enhanced wiring device responds to exceeding a threshold limit stored in the memory of the enhanced wiring device.

5. The system in accordance with claim 1, wherein the sensor is selected from the group consisting of a temperature sensor, a passive infrared sensor, a motion detector, an electrical voltage sensor, $CO_2$ sensor, and an electrical current sensor.

6. The system in accordance with claim 1, wherein the enhanced wiring device is a wall-mounted electrical power switch selected from the group consisting of momentary lever, maintained lever, toggle, and pushbutton.

7. The system in accordance with claim 1, further comprising a controller for a building automation system network in communication with the system control unit, the data from the sensor in the enhanced wiring device providing input to the controller via the system control unit.

8. The system in accordance with claim 7, wherein the building automation system network comprises a building automation and control network protocol.

9. The system in accordance with claim 1, further comprising a plurality of enhanced wiring devices, wherein the system control unit issues commands to one enhanced wiring device in response to exceeding a threshold limit stored in the memory of another enhanced wiring device.

10. The system in accordance with claim 1, further comprising an electronically-equipped badge for a system user, including at least one transmitter embedded in the badge, wherein the transmitter transmits a special identification code at a low power and low duty cycle, and wherein the special identification code is received by one of the enhanced wiring devices in proximity to the user.

11. The system in accordance with claim 1, wherein the enhanced wiring device is an electrical outlet receptacle having a tamper-resistant device, the tamper-resistant device comprising:
a yoke assembly adapted for connection to an electrical lead wire of a building wiring system;
an interlock housing coupled to the yoke assembly, the interlock housing defining a recess; and
an interlock body comprising at least two wedge surfaces on a first side of the body adapted to provide a moveable barrier to prongs of a plug, and further comprising a latching tab on an opposing second side of the body, the latching tab positioned proximate to the recess in the interlock housing;
wherein the application of an uneven force to the wedge surfaces urges the latching tab into the recess in the interlock housing, and the application of a balanced force applied to the wedge surfaces urges the interlock body to move in a direction normal to the direction of the force.

12. The system of claim 1, further comprising a tamper-resistant electrical outlet for housing an internal circuit board, comprising:
an internal circuit board disposed perpendicular to a face of said tamper-resistant electrical outlet said internal circuit board comprising an antenna comprising a vertically oriented microstrip disposed adjacent a front edge of a circuit board such that when said tamper-resistant electrical outlet is mounted in a wall of a room, said circuit board is oriented about perpendicular to the wall and said antenna protrudes away from a plane of the wall towards the room;
a yoke assembly adapted for connection to an electrical lead wire of a building wiring system;
an interlock housing coupled to the yoke assembly, the interlock housing defining a recess;
an interlock body comprising at least two wedge surfaces on a first side of the body adapted to provide a moveable barrier to prongs of a plug, and further comprising a latching tab on an opposing second side of the body, the latching tab positioned proximate to the recess in the interlock housing said interlock body movable in a direction substantially parallel to a long axis of said internal circuit board;
wherein the application of an uneven force to the wedge surfaces urges the latching tab into the recess in the interlock housing, and the application of a balanced force applied to the wedge surfaces urges the interlock body to move in a direction normal to the direction of the force.

13. The tamper-resistant electrical outlet according to claim 12, further comprising a spring coupled to the interlock housing, the spring adapted to provide a resistive force against movement of the interlock body.

14. The tamper-resistant electrical outlet according to claim 12, wherein the direction of the balanced force is horizontal, and the movement of the interlock body is vertical.

15. The system of claim 1, wherein said enhanced wiring device comprises an electrical outlet receptacle wherein a centerline of said electrical outlet receptacle as defined by a centerline of a ground receptacle is offset from a centerline of a yoke of said enhanced wiring device.

16. In a system comprising one or more enhanced wiring devices, the steps of:
providing a system control unit comprising a system control unit processor, at least one system control unit memory coupled to the system control unit processor, and a network interface coupled to the system control unit processor, an enhanced wiring device in wireless communication with the system control unit, the enhanced wiring device being hard-wired into a building electrical infrastructure and selected from the group consisting of an electrical outlet receptacle and an electrical power switch, the enhanced wiring device comprising: a plurality of sensors including a passive infrared (PIR) sensor for monitoring a stimulus parameter in a room of the building, and a temperature sensor, said PIR sensor and said temperature sensor disposed at a front edge of a circuit board; an enhanced wiring device processor, at least one enhanced wiring device memory coupled to the enhanced wiring device processor, and program instructions stored on the at least one enhanced wiring device memory for execution by the enhanced wiring device processor to evaluate and communicate data from the sensor, an antenna to wirelessly receive and transmit communication the system control unit, said antenna comprising a vertically oriented microstrip disposed at a front edge of said circuit board such that when said enhanced wiring device is mounted in a wall of a room, said circuit board is oriented about perpendicular to the wall and said antenna protrudes away from a plane of the wall towards the room such that a performance of said antenna is not compromised by a rear cover or an electrical box within which said enhanced wiring device is disposed a front bezel having a front surface and a plurality of side surfaces which covers said antenna and said circuit board with access via openings in said front bezel front surface to either of said electrical outlet receptacle or said electrical power switch disposed under said front bezel extending into said front bezel beyond said plane of said wall, said front bezel including an opening in said front surface for said PIR sensor and a plurality of circulation ports disposed in at least two sides of said plurality of side surfaces; and a user interface in communication with the network interface of the system control unit, the user interface adapted to configure and monitor data from the enhanced wiring device via the system control unit;
hard-wiring the one or more enhanced wiring devices to a building's electrical infrastructure;
sensing, by a sensor on one of the enhanced wiring devices, a stimulus parameter in a room of the building as a sensed parameter;
storing, in the enhanced wiring device memory, data representative of the sensed parameter; and
executing program instructions to transmit the sensed parameter data to the system control unit.

17. The method according to claim 16, further comprising the steps of comparing, by the one or more enhanced wiring device processors, the sensed parameter data of at least one or more of said enhanced wiring devices to a threshold limit value and, if the sensed parameter data exceeds the threshold limit value, executing program instructions to change a state of an electrical load coupled to an enhanced wiring device of said one or more enhanced wiring devices.

18. The method according to claim 17, wherein the sensor is an occupancy sensor, and executing the program instructions applies or terminates power to a climate control apparatus coupled to the first enhanced wiring device.

19. The method according to claim 17, wherein the sensor is an occupancy sensor, wherein the presence or absence of an occupant is ascertained by comparing a calibrated bit error rate of the sensor data to an actual bit error rate.

20. The method according to claim 16, further comprising the steps of comparing, by the one or more enhanced wiring device processors, the sensed parameter data of a first enhanced wiring device to a threshold limit value and, if the sensed parameter data exceeds the threshold limit value, transmitting the sensed parameter data via the antenna to the system control unit, the system control unit transmitting instructions to a second enhanced wiring device in response to the sensed parameter data, the second enhanced wiring device executing program instructions to change a state of an electrical load coupled thereto.

21. The method according to claim 16, the system further comprising a controller for a building automation system network in communication with the system control unit, the method further comprising the step of transmitting to the controller the sensed parameter data for use in controlling the building automation system network.

22. The method according to claim 21, wherein the sensed parameter data provides real-time information regarding building power usage at a sub-circuit level, and building occupancy and ambient temperature at a sub-room level.

23. The method according to claim 22, wherein the sensed parameter data increases an efficiency of other building systems by dynamically adjusting at least one or more heating and cooling loads or by adapting security system features.

* * * * *